US012679934B1

(12) United States Patent
Ibrahim et al.

(10) Patent No.: US 12,679,934 B1
(45) Date of Patent: Jul. 14, 2026

(54) METHOD FOR PRODUCING ANTIOXIDANT-RICH BIODEGRADABLE BIOPLASTIC FROM DATE PALM PEELS

(71) Applicant: KING FAISAL UNIVERSITY, Hofouf (SA)

(72) Inventors: Mohamed Fikry Ibrahim, Hofouf (SA); Nashi Khaled Alqahtani, Hofouf (SA)

(73) Assignee: KING FAISAL UNIVERISTY, Hofouf (SA)

( * ) Notice: Subject to any disclaimer, the term of this patent is extended or adjusted under 35 U.S.C. 154(b) by 0 days.

(21) Appl. No.: 19/541,691

(22) Filed: Feb. 17, 2026

(51) Int. Cl.
*C08H 8/00* (2010.01)
*C08J 3/12* (2006.01)
*C08J 3/18* (2006.01)

(52) U.S. Cl.
CPC .................. *C08H 8/00* (2013.01); *C08J 3/12* (2013.01); *C08J 3/18* (2013.01); *C08J 2397/02* (2013.01)

(58) Field of Classification Search
None
See application file for complete search history.

(56) References Cited

U.S. PATENT DOCUMENTS

| | | | | |
|---|---|---|---|---|
| 7,935,368 | B2 * | 5/2011 | Yamada | A23D 9/007 424/725 |
| 10,655,009 | B1 * | 5/2020 | Abu-Jdayil | B29B 7/92 |
| 11,255,052 | B1 * | 2/2022 | Abu-Jdayil | D21J 1/20 |
| 12,409,480 | B2 * | 9/2025 | Parks | A23K 10/37 |
| 2022/0056262 | A1 * | 2/2022 | Galiwango | C08L 97/02 |

FOREIGN PATENT DOCUMENTS

| | | |
|---|---|---|
| JP | H1067876 A | 3/1998 |
| KR | 100832239 B1 | 5/2008 |
| TN | 2018000412 A1 | 6/2020 |
| WO | 2024062440 A1 | 3/2024 |

OTHER PUBLICATIONS

Impact of glycerol on oil palm trunk starch bioplastics enhanced with citric-acid epoxidized palm oil oligomers, Hernando et al., Case Studies in Chemical and Environmental Engineering 10 (2024) 100839 (Year: 2024).*
Oil palm compared to Date Palm—Google search (Year: 2026).*
Isroi, et al., "Bioplastic Production From Cellulose Of Oil Palm Empty Fruit Bunch", 2017 IOP Conf. Ser.: Earth Environ. Sci. 65 012011, DOI :10.1088/1755-1315/65/1/012011.
Kumar S, et al., "Synthesis of Bioplastics Using Fruit Peels: A Sustainable" International Journal of Innovative Research In Technology, vol. 11 Issue 8, Jan. 2025, ISSN: 2349-6002.
Hernando, et al., "Impact Of Glycerol On Oil Palm Trunk Starch Bioplastics Enhanced With Citric-Acid Epoxidized Palm Oil Oligomers" Case Studies in Chemical and Environmental Engineering, vol. 10, (Dec. 2024), DOI: https://doi.org/10.1016/j.cscee.2024.100839.
Kokila, et al., "Characterization Of Biobased Plasticizer Extracted From Palm Fruit Waste: A Novel Approach For Properties Enhancement In Cementitious Composites", Journal of Polymer Research, J Polym Res 32, 327 (2025), DOI: https://doi.org/10.1007/s10965-025-04545-3. Abstract.

* cited by examiner

*Primary Examiner* — Peter A Salamon
(74) *Attorney, Agent, or Firm* — Nath, Goldberg & Meyer; Joshua B. Goldberg

(57) ABSTRACT

A method of producing bioplastics from date palm (*Phoenix dactylifera*) peels including cleaning date palm peels to provide clean date palm peels, subjecting the clean date palm peels to size reduction to provide a date palm peel powder, adding an acid solution to the date palm peel powder to form a bioplastic solution; agitating the bioplastic solution to provide a uniformly dispersed suspension; adding a plasticizer to the uniformly dispersed suspension to provide a plasticized suspension; and heating the plasticized suspension while stirring to provide a gelatinized polymeric material or uniform polymer matrix.

17 Claims, No Drawings

METHOD FOR PRODUCING ANTIOXIDANT-RICH BIODEGRADABLE BIOPLASTIC FROM DATE PALM PEELS

BACKGROUND

1. Field

The present disclosure relates to synthesis of bioplastics and, particularly, a method for producing antioxidant-rich bioplastic from date palm peels.

2. Description of the Related Art

Conventional petroleum-based plastics persist in the environment for centuries, accumulating in oceans and landfills and contributing substantially to global pollution. Their non-biodegradable nature has intensified the search for sustainable alternatives derived from renewable biomass. At the same time, the date palm industry generates large quantities of agricultural waste each year, particularly in regions such as the Middle East and North Africa. This waste includes rejected fruits known as culls, as well as date press cake—the fibrous residue primarily composed of skins and peels that remains after the separation process used for producing free-peel paste. Much of this material is currently discarded or used as low-value animal feed, despite its potential as a valuable resource.

Existing forms of bioplastics often compete with human food supplies, which limits their sustainability. Research has explored the use of other fruit peels for bioplastic production; however, date-based materials pose unique challenges. Their high sugar content can lead to caramelization or stickiness during processing, and the tough, fibrous skin requires specialized pretreatment to produce a functional polymer matrix.

Thus, a method of producing bioplastics solving the aforementioned problems are desired.

SUMMARY

The present subject matter relates to a method of producing bioplastics from date palm (*Phoenix dactylifera*) peels. In an embodiment, the bioplastics are biodegradable polymers. In an embodiment, the present method converts agricultural waste, specifically date palm peels, into a biodegradable thermoplastic film suitable for packaging and food applications.

According to an embodiment, the present method includes cleaning date palm peels to provide clean date palm peels, subjecting the clean date palm peels to size reduction to provide a date palm peel powder, adding an acid solution to the date palm peel powder to form a bioplastic solution; adding a plasticizer to the bioplastic solution to provide a flexible polymeric material; agitating the flexible polymeric material under to provide a gelatinized polymeric material or uniform polymer matrix. In an embodiment, agitating the mixture can be done while heating the mixture. The uniform polymeric matrix can be molded into a desired shape.

In an embodiment, a method of producing bioplastics from date palm (*Phoenix dactylifera*) peels, consists essentially of cleaning date palm peels to provide clean date palm peels; subjecting the clean date palm peels to size reduction to provide a date palm peel powder; adding an acid solution to the date palm peel powder to form a bioplastic solution; agitating the bioplastic solution to provide a uniformly dispersed suspension; adding a plasticizer to the uniformly dispersed suspension to provide a plasticized suspension; and heating the plasticized suspension while stirring to provide a gelatinized polymeric material.

In an embodiment, polymeric matrix can molded into any desired shape. The molding step involves spreading or pouring the matrix into a desired shape, where it is allowed to dry and cure into a solid bioplastic film. The resulting material can be a biodegradable, compostable, and enriched with natural antioxidant properties due to the inherent phenolic compounds present in date peels. The present method offers a sustainable, low-cost approach to bioplastic production while contributing to waste valorization in the date processing industry.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

DEFINITIONS

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a method of producing bioplastics from date palm (*Phoenix dactylifera*) peels. According to an embodiment, the present method includes cleaning date palm peels to provide clean date palm peels, subjecting the clean date palm peels to size reduction to provide a date palm peel powder, adding an acid solution to the date palm peel powder to form a bioplastic solution; agitating the bioplastic solution to provide a uniformly dispersed suspension; adding a plasticizer to the uniformly dispersed suspension to provide a plasticized suspension; and heating the plasticized suspension while stirring to provide a gelatinized polymeric material or uniform polymer matrix. In an embodiment, agitating the flexible polymeric material can be done while heating or at room temperature. In an embodiment, the gelatinized polymeric material or uniform polymer matrix can be molded into a desired shape.

In an embodiment, cleaning the date palm peels includes washing and drying the date palm peels to remove excess sugars and water-soluble impurities from the date palm peels. In an embodiment, subjecting the clean date palm peels to size reduction comprises finely grinding the date palm peels to provide the date palm peel powder.

In an embodiment, adding the acid solution to the date palm peel powder causes the date palm peel powder to undergo acid hydrolysis, thereby breaking down complex starches and cellulosic fibers to enhance polymer formation.

In an embodiment, the plasticizer is glycerol. In an embodiment, the glycerol improves flexibility and mechanical performance of the polymeric material. In an embodiment, heating the plasticized suspension while stirring or under agitation induces gelatinization, forming a gelatinized polymeric material or uniform polymeric matrix suitable for shaping.

In an embodiment, the polymeric matrix can be molded into any desired shape. The molding step can involve spreading or pouring the matrix into a desired shape, and allowing it to dry and cure into a solid bioplastic film. The resulting solid material is biodegradable, compostable, and enriched with natural antioxidant properties due to the inherent phenolic compounds present in date peels.

According to an embodiment, the date peels can be cleaned and dried prior to being subjected to acid hydrolysis or acid treatment. In one embodiment, the date peels can be separated from the date fruit flesh to obtain date peels or skins and fiber of the date fruit. Cleaning the date peels can include washing the date peels thoroughly with distilled water at about 40° C. to remove surface sugars. High sugar content can interfere with polymerization and attract moisture (hygroscopicity). The washed date peels can be dried in a hot air oven at a temperature of about 60° C., e.g., 60+5° C., for about 24 hours or until the moisture content is below 10%, e.g., below 5%.

According to an embodiment, subjecting the dried date peels to size reduction can include grinding the dried date peels using a mechanical mill and sieving the ground date peels to obtain a fine powder.

According to an embodiment, the bioplastic solution can be formed by combining water with the date peel powder to provide a first mixture. For example, about 100 mL of water (distilled water) can be combined with about 3 grams of date peel powder to provide the mixture. Then, corn starch can be mixed into the first mixture to provide a second mixture. For example, about 7 grams of corn starch can be added to the first mixture and dispersed thoroughly. A mild acid can then be added to the second mixture to provide the bioplastic solution. For example, about 5 ml of 5% Acetic Acid (vinegar) can be added to the second mixture to provide the bioplastic solution. The bioplastic solution can then be agitated, e.g., stirred at about 300 to about 500 RPM for about 10 minutes to about 15 minutes at room temperature, to ensure uniform dispersion and, thereby provide a uniformly dispersed suspension.

According to an embodiment, the plasticizer added to the uniformly dispersed suspension can include glycerol ($C_3H_8O_3$). In an embodiment, about 0.5 ml of glycerol can be added to the uniformly dispersed suspension per gram of date peel powder. The addition of the plasticizer can help to reduce intermolecular forces between polymer chains, increasing the flexibility and tensile strength of the resulting plastic and preventing the plastic from becoming brittle.

According to an embodiment, heating the plasticized suspension can include heating the plasticized suspension to a temperature ranging from about 80° C. to about 85° C., e.g., about 80° C. or about 85° C., with continuous stirring to prevent settling and scorching. The plasticized suspension can be heated for about 5 minutes or until the suspension is transformed from a watery suspension into a viscous, homogeneous paste (gelatinization polymeric material). The mixture can be heated on a hot plate.

The polymeric matrix can be molded into a desired shape. For molding, the viscous gel or paste can be poured onto a non-stick casting surface (glass plate) and spread to a uniform thickness, e.g., about 2 mm thick, to form a cast. The cast can then be dried in an oven at a temperature of about 55° C., e.g., 55±6° C. for about 24 hours, to form a bioplastic film. Once dry, the bioplastic film can be peeled off the surface and cured, e.g., at room temperature for about 24 hours to stabilize mechanical properties of the bioplastic film.

It is to be understood that method of producing bioplastics from date palm peels is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of producing bioplastics from date palm (*Phoenix dactylifera*) peels, comprising:
cleaning the date palm peels to provide clean date palm peels;
subjecting the clean date palm peels to size reduction to provide a date palm peel powder;
adding an acid solution to the date palm peel powder to form a bioplastic solution;
agitating the bioplastic solution to provide a uniformly dispersed suspension;
adding a plasticizer to the uniformly dispersed suspension to provide a plasticized suspension; and
heating the plasticized suspension while stirring to provide a gelatinized polymeric material.

2. The method of claim 1, wherein cleaning the date palm peels can comprise washing the date palm peels with water to remove excess sugars and water-soluble impurities from the date palm peels and then drying the washed date palm peels.

3. The method of claim 1, wherein subjecting the clean date palm peels to size reduction comprises grinding the date palm peels to provide the date palm peel powder.

4. The method of claim 1, wherein the acid solution comprises 5% acetic acid.

5. The method of claim 1, wherein the bioplastic solution is agitated by stirring at about 300 to about 500 RPM for about 10 minutes to about 15 minutes at room temperature.

6. The method of claim 1, wherein the plasticizer is glycerol ($C_3H_8O_3$).

7. The method of claim 6, wherein about 0.5 ml of glycerol is added to the uniformly dispersed suspension per gram of date peel powder.

8. The method of claim 1, wherein heating the plasticized suspension comprises heating the plasticized suspension to a temperature ranging from about 80° C. to about 85° C. for about 5 minutes.

9. The method of claim 1, further comprising molding the gelatinized polymeric material into a desired shape.

10. A method of producing bioplastics from date palm (*Phoenix dactylifera*) peels, consisting essentially of:
cleaning the date palm peels to provide clean date palm peels;
subjecting the clean date palm peels to size reduction to provide a date palm peel powder;
adding an acid solution to the date palm peel powder to form a bioplastic solution;
agitating the bioplastic solution to provide a uniformly dispersed suspension;
adding a plasticizer to the uniformly dispersed suspension to provide a plasticized suspension; and
heating the plasticized suspension while stirring to provide a gelatinized polymeric material.

11. The method of claim 10, wherein cleaning the date palm peels comprises washing the date palm peels with water to remove excess sugars and water-soluble impurities from the date palm peels and then drying the washed date palm peels.

12. The method of claim 10, wherein subjecting the clean date palm peels to size reduction comprises grinding the date palm peels to provide the date palm peel powder.

13. The method of claim 10, wherein the acid solution comprises 5% acetic acid.

14. The method of claim 10, wherein the bioplastic solution is agitated by stirring at about 300 to about 500 RPM for about 10 minutes to about 15 minutes at room temperature.

15. The method of claim 10, wherein the plasticizer is glycerol ($C_3H_8O_3$).

16. The method of claim 15, wherein about 0.5 ml of glycerol is added to the uniformly dispersed suspension per gram of date peel powder.

17. The method of claim 10, wherein heating the plasticized suspension comprises heating the plasticized suspension to a temperature ranging from about 80° C. to about 85° C. for about 5 minutes.

* * * * *